Feb. 23, 1937.  H. J. ALVORD  2,071,489
TRAILER
Filed Feb. 29, 1936  2 Sheets-Sheet 1
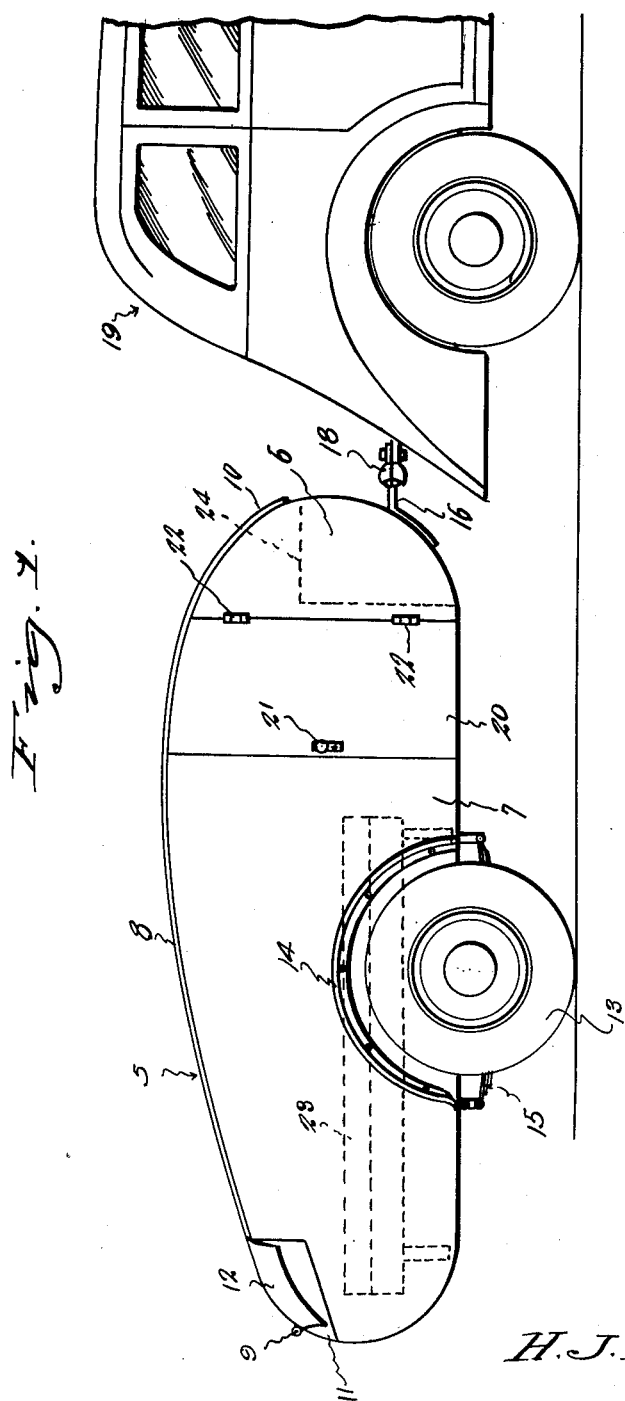
Inventor
H. J. Alvord
By Clarence A. O'Brien and
Hyman Berman
Attorneys

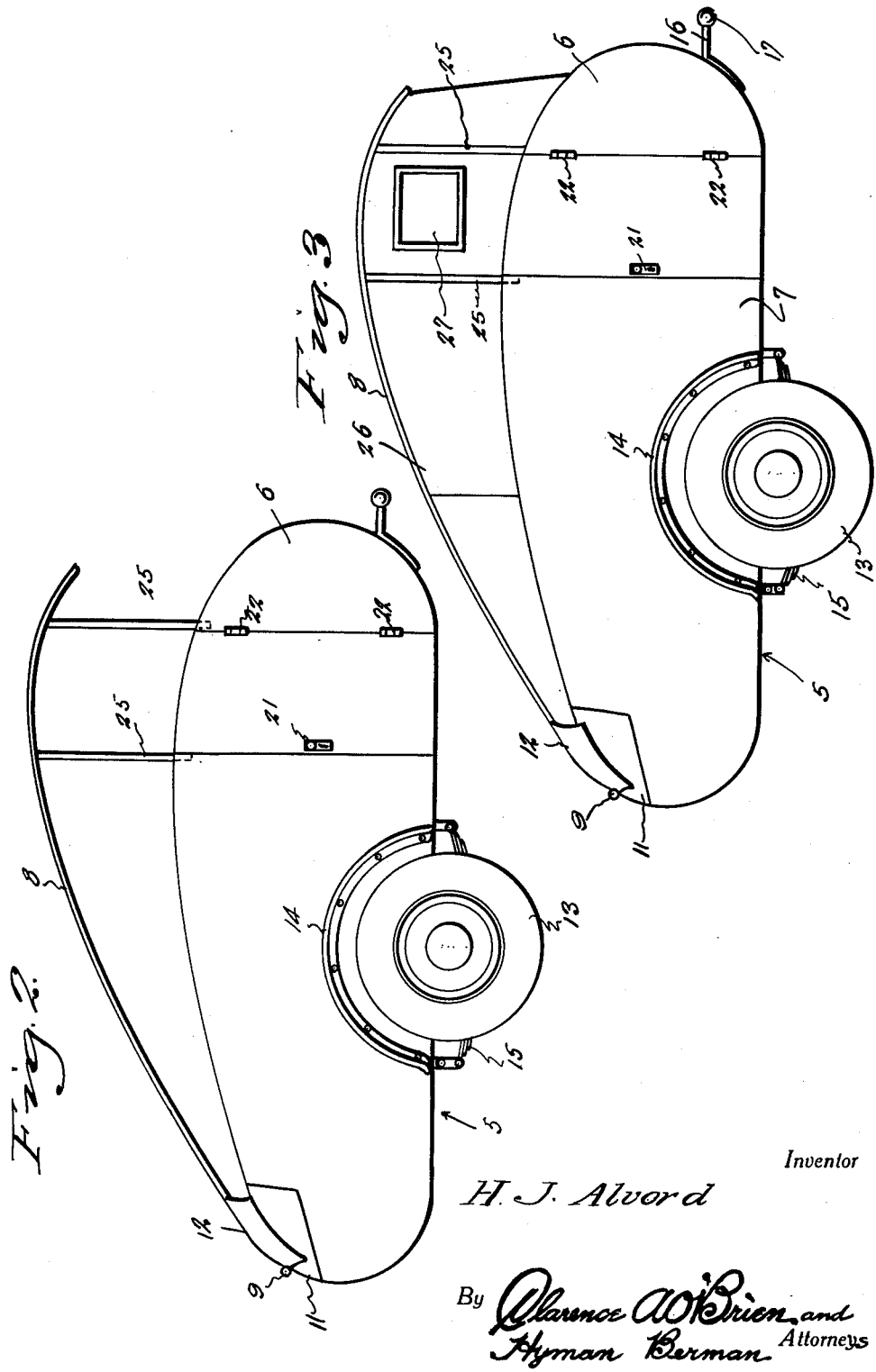

Patented Feb. 23, 1937

2,071,489

UNITED STATES PATENT OFFICE 2,071,489

TRAILER

Harry J. Alvord, Phoenix, Ariz.

Application February 29, 1936, Serial No. 66,483

1 Claim. (Cl. 296—23)

This invention appertains to new and useful improvements in land vehicles and more particularly to a trailer of the tourist type such as is generally pulled by a passenger automobile.

The principal object of the present invention is to provide a trailer which is of shallow depth, so that when the same is being hauled, it will not be of such a height as to interfere with the rear vision of the driver of the lead vehicle.

Another important object of the invention is to provide a trailer which is normally of a shallow depth but which is provided with an elevatable top section which can be raised to form a compartment within the trailer sufficiently large to permit a person or persons to move about therein.

Other important objects and advantages of the invention will become apparent to the reader of the following specification.

In the drawings:

Figure 1 shows a side elevational view of the trailer attached to an automobile, the trailer being shown in closed position.

Figure 2 represents a side elevational view of the trailer with the top in open position.

Figure 3 is a side elevational view of the trailer with the top in elevated position and with the side curtains in position.

Referring to the drawings wherein like numerals designate like parts, it can be seen that the trailer which is generally referred to by numeral 5 consists of a streamline body consisting of the substantially hemispherical shaped nose or front end 6 and the rearwardly tapering body portion 7. This body portion 7 is provided with an elongated longitudinally curved top 8 which is hingedly connected at its rear end as at 9 and overlaps at its forward edge, as at 10, the nose portion 6 of the body. The indentation 11 in the side portions of the rear end of the body 7 accommodate the depending wing members 12 of the top 8.

Numeral 13 represents the wheels for supporting the trailer, these wheels 13 provided with mudguards 14 and springs 15, and it will be observed, that in order to bring the trailer as close to the ground as possible, the axle of the wheel is located immediately under the floor level of the trailer.

As is shown in Figures 2 and 3, numeral 16 represents a forwardly extending shank having a ball 17 thereon for engagement into the socket structure 18 carried by the lead vehicle generally referred to by the numeral 19. This forms a universal joint between the trailer and the lead vehicle or automobile 19.

Just rearwardly of the nose portion 6 of the trailer, the body 7 is provided with an entrance which can be closed by the door 20, the same being provided with a knob 21 and hinges 22. The trailer is of such an extent that one or two cots or beds 23 can be disposed therein as well as any other small pieces of furniture 24.

When the trailer is to be used for sleeping quarters, as when the lead vehicle 29 has stopped for the night, the top 8 is elevated to the position shown in Figures 2 and 3 and prop members 25 are interposed between the top 8 and the body 7 so as to hold the top 8 in the elevated position substantially shown in Figures 2 and 3.

Furthermore, side curtains 26 with windows 27 therein can be connected between the edge portions of the top 8 and the body 7 so as to complete privacy and protection against flying insects as well as weather conditions.

It will be observed, that because of the normally shallow depth of the trailer, the existence of the trailer behind the automobile 19 will not interfere with the rear vision of the driver.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

A trailer comprising an elongated body provided with wheels and open at its top side, a movable top for the body, said top being hingedly connected at one end to one end of the body and being elevatable at its opposite end, and depending wing members on the said top adjacent the hinged end thereof for engaging the sides of the body and serving as a guide for the top.

HARRY J. ALVORD.